Figure 1:
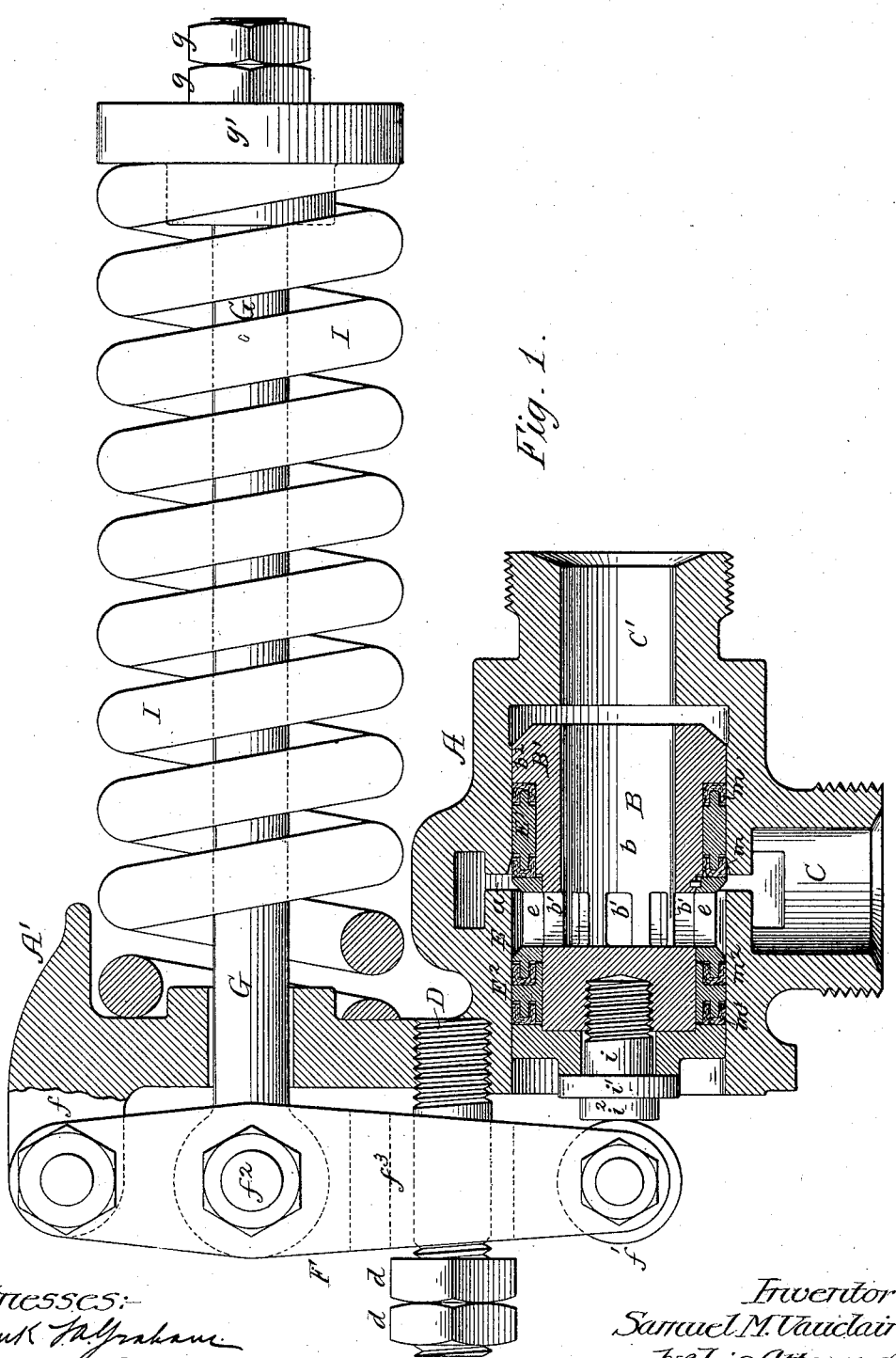

No. 722,058. PATENTED MAR. 3, 1903.
S. M. VAUCLAIN.
REDUCING VALVE.
APPLICATION FILED MAR. 25, 1901.
NO MODEL. 2 SHEETS—SHEET 1.

Witnesses:—
Frank T. A. Graham
Wm. A. Barr

Inventor:—
Samuel M. Vauclain,
by his Attorneys,
Howson & Howson

No. 722,058. PATENTED MAR. 3, 1903.
S. M. VAUCLAIN.
REDUCING VALVE.
APPLICATION FILED MAR. 25, 1901.
NO MODEL. 2 SHEETS—SHEET 2.
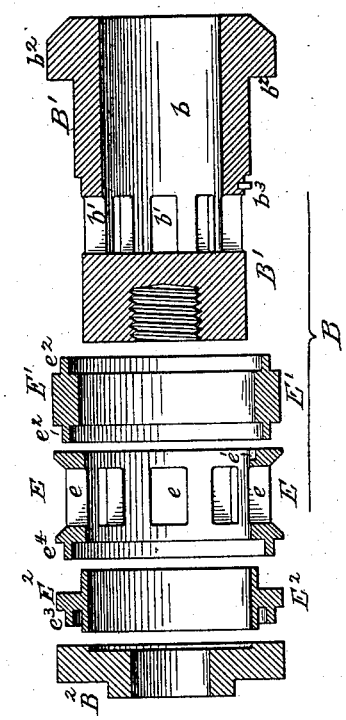
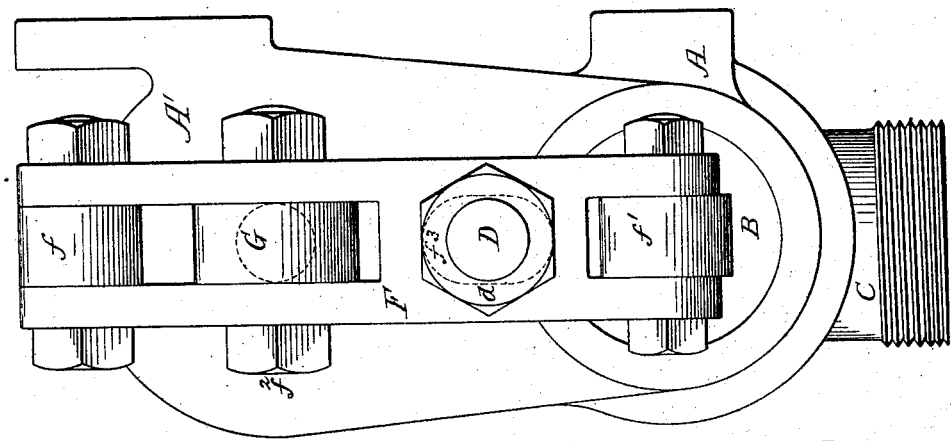
Witnesses:
Frank T. A. Graham
Wm. A. Barr
Inventor:—
Samuel M. Vauclain,
by his Attorneys,
Howson & Howson

UNITED STATES PATENT OFFICE.

SAMUEL M. VAUCLAIN, OF PHILADELPHIA, PENNSYLVANIA, ASSIGNOR TO BURNHAM, WILLIAMS & COMPANY, OF PHILADELPHIA, PENNSYLVANIA, A FIRM.

REDUCING-VALVE.

SPECIFICATION forming part of Letters Patent No. 722,058, dated March 3, 1903.

Application filed March 25, 1901. Serial No. 52,854. (No model.)

*To all whom it may concern:*

Be it known that I, SAMUEL M. VAUCLAIN, a citizen of the United States, residing in Philadelphia, Pennsylvania, have invented certain Improvements in Reducing-Valves, of which the following is a specification.

The main object of my invention is to improve the construction of spring-actuated reducing-valves, so that the movement of the valve will be greater than the expansion or contraction of the spring.

A further object of the invention is to provide means so that the outward movement of the valve can be regulated and to construct the valve so that the parts can be readily assembled.

In the accompanying drawings, Figure 1 is a sectional view of my improved reducing-valve. Fig. 2 is an end view, and Fig. 3 is a sectional view, of the parts of the piston detached.

A is the valve-casing, in which is a port $a$ in line with the inlet-port C from the high-pressure drum. In the end of the casing is an outlet-port $C'$, communicating with the low-pressure drum. The opposite end of the casing is open. Mounted within the casing is a valve B. This valve is hollow and is open toward the outlet-port $C'$ and closed at the opposite end. Passages $b'$ communicate with the central opening $b$ and, when the valve is in the mid-position, with the port $a$.

The valve-casing A has an extension $A'$, and pivoted to a lug $f$ on the extension is a lever F, having a roller $f'$, bearing against the end of the valve B. Coupled to the lever F at $f^2$ is a rod G, which passes through an opening in the extension $A'$ and has at its opposite end nuts $g$ $g$ and a washer $g'$. Mounted between the washer and the extension $A'$ is a coiled spring I, which can be set to any desired pressure by means of the nuts $g$ $g$.

D is a stud screwed into the casing A. This stud projects through a slot $f^3$ in a lever F, and on the threaded portion of the stud are two nuts $d$ $d$, which can be adjusted on the stud to limit the outward movement of the lever F and the valve B.

The valve B is constructed as follows: Referring to Figs. 1 and 3, $B'$ is the body of the valve, having the central opening $b$, ports $b'$, and a flange $b^2$ at its rear end. $B^2$ is a cap arranged to fit on the end of the body portion $B'$ of the valve, and this cap is secured in position by a bolt $i$, having a flange $i'$ and a head $i^2$. The bolt is passed through the opening in the cap and is screwed into a threaded opening in the body $B'$. The flange $i'$ rests against the cap and holds it in position, and the roller $f'$ on the lever F rests against the head $i^2$ of the bolt. Between the cap $B^2$ and the flange $b^2$ of the body portion $B'$ are three rings E E' $E^2$, which are slipped over the body portion of the valve, as clearly shown in Fig. 1. The central ring E has ports $e$, which aline with the ports $b'$ of the body portion $B'$, and the ring E is held in alinement by means of a pin $b^3$ on the body portion entering a recess $e'$ in the ring E. The ring E' is reduced at each side $e^2$, and suitable packing-rings $m$ are mounted on the reduced portion of the ring E', as shown in Fig. 1. $E^2$ is a ring having a single reduced portion $e^3$, arranged to receive a packing-ring $m'$, and the ring E has a reduced portion $e^4$, shaped to receive a packing-ring $m^2$, so that when the parts of the valve are assembled, as in Fig. 1, there are two packing-rings between the ports of the valve and each end thereof, so as to prevent leakage between the valve and the casing. The parts of the valve can be readily assembled and held in place by the bolt $i$.

By the above construction it will be seen that the movement of the valve is greatly in excess of the expansion and contraction of the spring, which is of great advantage in reducing-valves and especially those used in reducing the pressure of compressed air, and I find by mounting the roller on the end of the lever and allowing the roller to bear upon the end of the valve that a much more delicate regulation can be attained than where a lever is connected to the valve by a pin-and-slot connection, and by making the valve in the manner described the parts can be readily removed for repacking or repairs and can be quickly assembled.

The screw-stud D may be used for another purpose than simply that of limiting the outward movement of the lever—that is, it can be used for forcing and holding the valve back, so that the ports of the valve will aline with the port of the casing in order to provide a clear opening in the event of the packing getting out of order or the sticking of the valve. The reducing-valve would then simply be an air-passage, and the air would be cut down by using the ordinary throttle-valve of the system until the reducing-valve was fixed.

I claim as my invention—

1. The combination in a reducing-valve, of a casing, inlet and outlet ports therein, a cylindrical valve, a spring-actuated lever resting against the valve, said valve having a body portion, a cap and intermediate rings, the central of said rings having ports alining with the port of the body portion, and packing mounted between the rings, substantially as described.

2. The combination in a reducing-valve, of the casing having inlet and outlet ports, a cylindrical valve mounted in said casing, a spring pressure device bearing against the valve, said valve having a flanged body portion, a cap, a series of rings mounted between the cap and the flange of the body portion, ports in the central ring and packing mounted between the several rings and the flange of the body portion and the cap, with a bolt securing the cap to the body portion, said cap holding the rings and packing in place, substantially as described.

3. The combination in a reducing-valve, of a casing having inlet and outlet passages, a spring pressure device bearing against the said valve, the valve having a flanged body portion, said body portion being open at the center and having radiating ports, a cap, and rings and packing mounted between the cap and the flange of the body portion, a bolt passing through an opening in the cap and into the body portion, said bolt holding the cap, rings and packing in position, the head of the bolt acting as a bearing for the spring pressure device, substantially as described.

In testimony whereof I have signed my name to this specification in the presence of two subscribing witnesses.

SAMUEL M. VAUCLAIN.

Witnesses:
MERLE MIDDLESER,
FRED WOOLLUM,